UNITED STATES PATENT OFFICE.

JOHN H. CHEEVER, OF NEW YORK, N. Y.

IMPROVEMENT IN PROCESSES OF VULCANIZING RUBBER HOSE.

Specification forming part of Letters Patent No. 123,454, dated February 6, 1872.

*To whom it may concern:*

Be it known that I, JOHN H. CHEEVER, of New York city, in the county and State of New York, have invented certain new and useful Improvements in Vulcanizing Hose; and I do hereby declare the following to be a full, clear, and exact description of the same.

My invention relates to the method of curing or vulcanizing hose made in part of canvas, or cloth, or threads, warps, yarn, or other fibrous or textile substance, and in part of India rubber or other vulcanizable gum, which latter acts as a cement, both for uniting the several folds of canvas or threads to form them into a cylindrical body, and for rendering the hose impermeable to water, steam, or other fluid.

It is unnecessary here to explain the methods heretofore employed of making and vulcanizing hose, as those acquainted with the art to which this my invention pertains are familiar with them; but it may be well to point out the defects or shortcomings of such methods.

Hose manufactured according to the methods heretofore in use are liable to be imperfectly vulcanized; or, if thorough vulcanization is sought to be attained, and if, therefore, they are allowed to remain in the heater for a longer period of time than is generally deemed necessary, there is liability of over-vulcanizing—that is, decomposing or burning the rubber, and, consequently, of weakening the hose, which is thereby caused to become leaky. The expense and labor and the uncertainty of obtaining a perfect article are, however, the principal difficulties attending this manufacture.

The object of my invention is to obviate these difficulties, and to produce a perfect hose, both in external appearance and in texture, so that while the hose shall be equally vulcanized throughout, and in less time than this could be accomplished heretofore, it shall, also, have a smooth and perfectly cylindrical external coating and internal lining, and, therefore, afford a more perfect and merchantable commodity than has hitherto been known. To this end my invention may be stated in general terms to consist in vulcanizing or heating the formed hose in a tube or cylindrical envelope, the hose being expanded to be molded, as it were, within and against the interior of the tube by means of steam applied within the hose, substantially as hereinafter described.

To enable others to make and use my said invention, and to understand the manner in which the same is or may be carried into effect, I shall now proceed to describe several modes employed by me to vulcanize hose of various kinds.

First, to line seamless or woven hose, I introduce into the interior of the hose in any known manner a lining of India rubber or other vulcanizable gum or compound in the green state, or partly vulcanizable and partly non-vulcanizable, as described in Letters Patent granted to James B. Forsyth and myself June 3, 1868, numbered 79,220. This hose, with its lining, I then place in a metallic tube or cylindrical envelope of such internal diameter that the hose will fit it snugly, which metallic tube is then run into a heater of ordinary or suitable construction. The tube should be about the length of the heater—say fifty feet long—and should be connected at one end with a steam-pipe, and provided at the other end with a blow-off pipe, provided with a stop-cock. After the tube is run into the heater, steam should be let on into it, which will enter the interior of the hose and force the vulcanizable lining against the interior surface of the fabric, thus causing the union of the two, and the vulcanization of the lining. The steam pressure also forces the outer surface of the hose against the surrounding metallic tube or envelope, thus giving a very complete finish to the exterior of the hose, and preventing it from bulging in spots or expanding unequally, and from becoming crooked, defects which are frequently found in hose of this kind made without the employment of an external metallic envelope. When the vulcanization is complete, steam is shut off, and what remains in the hose, whether still in the form of steam or condensed into water, can escape at the other end through the cock, which is opened for the purpose. In lieu of steam, it will be, of course, understood that hot air or other suitable expanding agent may be employed. In order to make seamless woven hose both coated and lined with vulcanized rubber, I take the fabric base of the hose, and apply to its exterior and interior a coating and a lining of properly-prepared rubber in the green state by any of the known methods. I then place the hose thus prepared in the metallic tube, which is run into the heater until the vulcanizing operation is completed, steam or other expanding agent being introduced into the interior of the hose, and there allowed to remain until the close of the operation, in order to force the lining out into close contact with the interior walls of the hose.

Second, the same process is applicable to the manufacture of hose made up in the usual manner—that is, by wrapping around a mandrel, rubber in the green state being interposed between its folds. Hose of this kind can be lined or both lined and coated with a sheet of green rubber or other vulcanizable substance in the ordinary way. It is then introduced into the metallic tube or envelope; the latter is placed in the heater, and steam is let on, as before. The heater heats the tube and inclosed hose from the outside, and the steam acts on the hose from the inside, so that in this manner a perfectly-molded and vulcanized hose, with a highly-finished exterior, and either lined or both lined and coated with rubber, is produced.

Third, the same process is also applicable to the manufacture of hose made by threads, warps, yarn, or fabric wound spirally on a mandrel. And, indeed, my method is here highly necessary, as it would be dangerous and productive of injury to hose of this kind to introduce into it steam at any considerable pressure unless the hose were contained in the external metallic tube or envelope.

From the above, the manner in which my process may be applied to the manufacture of other kinds of hose will be obvious to those skilled in the art to which this invention relates.

With regard to the metallic tube or envelope, it may be of any suitable length and dimensions. A length of about fifty feet is well adapted for the use for which it is designed. It should be well finished internally, so as to impart the proper finish to the exterior of the hose; and, if made in sections, they should be snugly and accurately fitted together, so as not to form any seam or ridge on the surface of the hose. If, however, a seam in any instance should be formed, it may be cut off by running a properly-gauged knife along the surface of the hose. The tube may also be divided longitudinally into two halves, hinged together, so as to open and close to permit the easy introduction and withdrawal of the hose. It may also be provided with a jacket for the reception of steam or other heating agent used to vulcanize the hose from the exterior. In short, its form and construction may be varied in many ways, which I do not deem it necessary to further particularize, it being manifest that the gist of my invention consists in inclosing the hose in a sheath or envelope of metal or other suitable material of sufficient strength and resistant capacity to support the hose against the pressure of the steam within it during the vulcanizing operation, or while the steam is let on, thereby preventing the hose from becoming misshapen, and imparting a very perfect finish to its exterior. Therefore,

What I claim as my invention, and desire to secure by Letters Patent, is—

The employment, in the process of vulcanizing hose, of steam or other expanding agent, introduced within the hose, in conjunction with an external metallic tube or envelope, which incloses the hose and retains therein the steam or other expanding agent during the vulcanizing operation, substantially as set forth.

In testimony whereof I have signed my name to this specification before two subscribing witnesses.

JOHN H. CHEEVER.

Witnesses:
 JOHN L. COBB,
 G. O. RICHARDS.